United States Patent [19]

Lichtenberg

[11] 4,159,581

[45] Jul. 3, 1979

[54] DEVICE FOR INSTRUCTION IN THE GAME OF BRIDGE AND METHOD OF AND DEVICE FOR DEALING PREDETERMINED BRIDGE HANDS

[76] Inventor: Edward Lichtenberg, 615 Kings Hwy., Moorestown, N.J. 08057

[21] Appl. No.: 826,774

[22] Filed: Aug. 22, 1977

[51] Int. Cl.² .................. G09B 19/22; A63F 1/00
[52] U.S. Cl. .................. 35/8 B; 273/149 P
[58] Field of Search .................. 35/8 B; 273/149 P

[56] References Cited

U.S. PATENT DOCUMENTS

| | | | |
|---|---|---|---|
| 2,199,497 | 5/1940 | Jondreau | 35/8 B |
| 2,296,113 | 9/1942 | Middlebrook | 273/149 P UX |
| 3,309,792 | 3/1967 | Tosti | 35/8 B |
| 3,312,473 | 4/1967 | Friedman et al. | 273/149 P |
| 3,428,323 | 2/1969 | Fried | 35/8 B X |
| 3,550,944 | 12/1970 | Chamberlin | 273/149 P |
| 3,709,501 | 1/1973 | Traylor | 273/149 P |
| 3,731,399 | 5/1973 | Gordy et al. | 35/8 B |
| 3,797,128 | 3/1974 | Amano | 35/8 B |
| 3,863,362 | 2/1975 | Borianne | 35/8 B |
| 3,899,837 | 8/1975 | Harnett | 35/8 B |
| 4,112,592 | 9/1978 | De Castro Basto | 35/8 B |

Primary Examiner—William H. Grieb
Attorney, Agent, or Firm—Morton C. Jacobs

[57] ABSTRACT

A device and method for dealing predetermined bridge hands to facilitate the widespread use of competitive scoring commonly followed in duplicate or tournament bridge by using a conventional deck of playing cards and a programmed device for setting forth different cuts of the deck for the different hands, different deals of the cut deck, and different distributions of the dealt hand so that each player cannot identify the hands dealt to each of the other players for the successive deals. A device for instructional analysis of bidding and playing and for presentation of expected scores and contracts is coordinated with the programmed dealing device.

9 Claims, 10 Drawing Figures

RANDOM DECK (PARTIAL)

FIRST SORT (SUIT, PARTIAL)

SECOND SORT (NUMERICAL ORDER, BY SUIT, PARTIAL)

SORTED, ASSEMBLED DECK

DEVICE FOR INSTRUCTION IN THE GAME OF BRIDGE AND METHOD OF AND DEVICE FOR DEALING PREDETERMINED BRIDGE HANDS

BACKGROUND OF THE INVENTION

This invention relates to devices for instructing in the game of bridge and to a method of and a device for dealing predetermined bridge hands to enable comparative scoring and instruction.

Tournament bridge play is conducted by random dealing a bridge deck of cards to four hands, and inserting each hand into four receptacles of a "duplicate board." Each player extracts his hand from the receptacle corresponding to his seat at the table (West, North, East, or South). The hands forming the deal are than bid and played in accordance with the rules of bridge. After each trick is played the player places the card, face down, in front of him. After the completion of play each player inserts the thirteen cards in front of him into the receptacle of the duplicate board from which it was removed. The purpose of this procedure is to allow replay of the same deal of four hands by other bridge partners (pairs), so that competitive scoring can be accomplished on the deal. The purpose of this competitive (or comparative) scoring is to ascertain the pair which can score the highest of all pairs playing the same set of hands, which maximizes the skill aspect of the game. Duplicate boards are used in tournaments at bridge clubs (called duplicate) or at home.

Other methods of comparative scoring for home use have been devised. An outside person has been used to make up special hands; special identifying marks have been placed on the backs of cards so that hands can be assembled so that each player only sees his own hand (e.g., U.S. Pat. No. 3,428,323); each player has his own private deck of cards from which he assembles hands in accordance with instruction sheets that he receives (e.g., U.S. Pat. No. 3,731,399 and No. 3,550,944); machines automatically deal out the hands (e.g., U.S. Pat. No. 3,312,473); and the deck of cards prior to dealing the hands is assembled by predetermined inverse operational sequences so that by going through the operational sequences the predetermined hands are assembled (e.g., U.S. Pat. No. 3,709,501). In addition, various instructional apparatus has been used (e.g., U.S. Pat. Nos. 3,863,362, 3,797,128, and 3,899,837) as well as the well-known technique, as in books on bridge, of supplying printed hands and analyses of bidding and playing alternatives for representative bridge hands.

Comparative scoring for the average player is desirable, not so much for competitive purposes, but stimulus to acquiring skills in the game. However, due to the requirement of special playing cards or elaborate or expensive equipment, comparative scoring has been limited in its use to the tournament or duplicate style of bridge.

SUMMARY OF THE INVENTION

It is among the objects of this invention to provide a new and improved device and method for dealing predetermined bridge hands from a standard deck of cards to facilitate the widespread use of comparative scoring.

Another object is to provide a new and improved device for instruction in the game of bridge which is simple in construction and economical in cost and which is based on the use of a standard deck of cards.

Another object is to provide a new and improved device for dealing an indefinitely large number of predetermined hands with a standard deck of cards.

Another object is to provide a new and improved method of dealing predetermined hands which conforms approximately to the standard mode of dealing in bridge.

In accordance with an embodiment of this invention, the method of dealing predetermined hands employs a standard deck of cards pre-sorted by rank and suit, and cut differently from deal to deal, and dealt differently from deal to deal into four hands, which hands are distributed differently from deal to deal in accordance with programs whereby each player does not identify the cards dealt to the other players. A device for directing the dealing of such hands includes a pad of charts having separate programmed sections for directing the dealers in the different cuts, deals and distributions.

Also in accordance with this invention, an instruction device includes a printed pad of charts physically coordinated with the dealing charts and corresponding thereto to supply the players, after play for each deal has been completed, with expected contract and score information and instructional analyses of bidding and play of the associated deal.

BRIEF DESCRIPTION OF THE DRAWINGS

The foregoing and other objects of this invention may be more fully understood from the following description when read together with the accompanying drawing in which.

In the drawing, corresponding parts are referenced throughout by similar numerals.

DETAILED DESCRIPTION OF THE INVENTION

Figure 1:
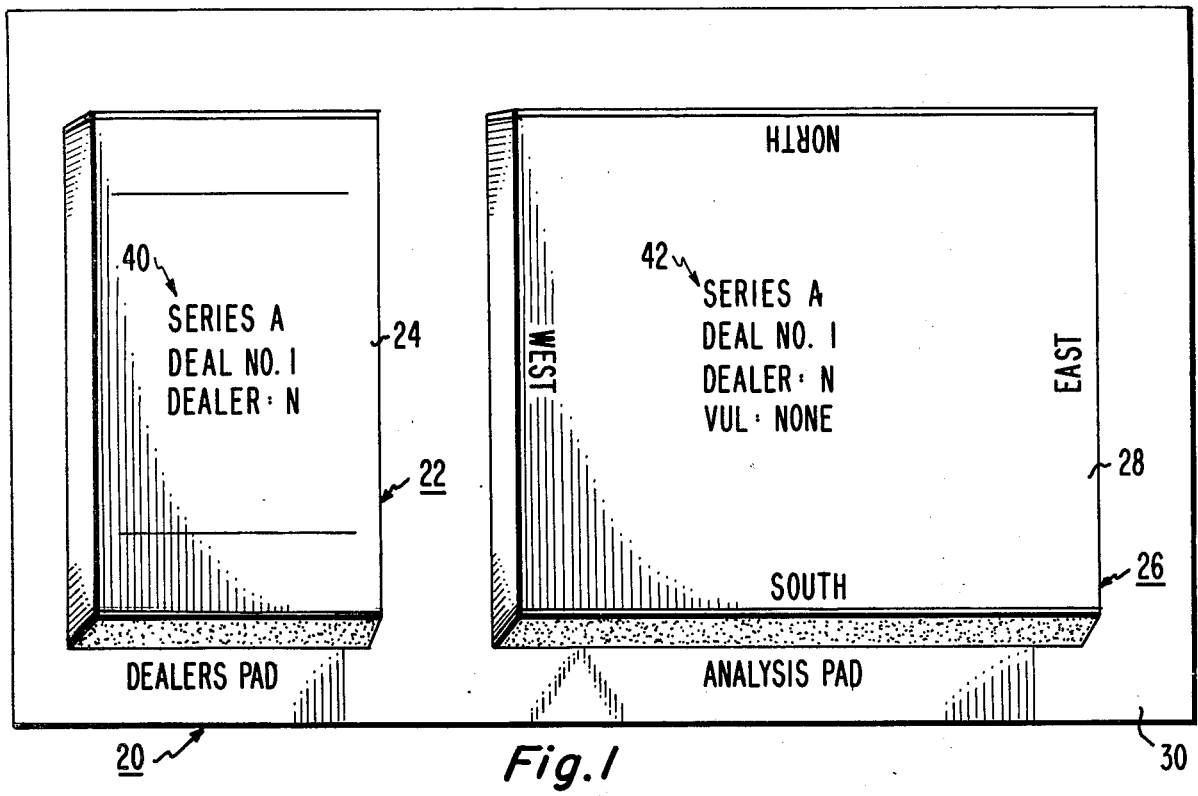
FIG. 1 is a plan perspective view of a device embodying this invention for instruction in the game of bridge and for directing the dealing of predetermined hands.

In the embodiment of FIG. 1, a bridge game instruction device 20 comprises a pad 22 of dealer sheets 24, a pad 26 of analysis sheets 28, with both pads mounted in juxtaposition on a stiff backing sheet 30. Also preferably used as part of the instruction device is a quadripartite dealing board 32 (FIG. 2) which is formed as a sheet that is printed or otherwise marked to form the four divisions 34, 35, 36 and 37 by lines 33, with each division being larger than the conventional bridge card and sufficiently large to accommodate a hand of thirteen bridge cards. The dealing board 32 also has identifying indicia such as numerals 1-4 for the successive divisions 34-37. In one form of the invention, the dealing board 32 is a sheet of paper that is imprinted and sufficiently thin for folding and packaging along with the pads 22 and 26 of FIG. 1.

The top face view of each dealer's sheet 24 bears a printed label 40 that identifies the particular deal represented by that sheet, and also identifies which of the four players (North, South, East or West, in accordance with the usual bridge convention) is to be the dealer. In addition, the particular series of games (and associated hands) represented by the pad of sheets 24 (e.g., Series A) is also set forth in that label. Each of the analysis sheets 28 bears on its top face a label 42 which conveys the same information as the label 40 for the correspondingly numbered deal, and also conveys additional information useful in playing the game such as which, if any, of the two pairs of players are vulnerable.

The underside 43 of each dealing sheet 24 (FIG. 5) is separated by suitable printed lines 44 (or other markings) into three sections 45, 46 and 47. The top section 45 specifies the cut operation to be performed by the dealer in dealing the cards; the next section 46 sets forth a detailed program for the dealing operation; and the lower section 47 sets forth the program to be followed in distributing the cards that have been dealt. The underface 49 of each analysis sheet 28 sets forth in conventional printed format 48 the respective four hands corresponding to the deal program set forth on the associated dealer sheet 24. In addition, the analysis sheet 28 sets forth the contract 50 which is to be expected, for example, by an expert player and the score 52 which is likewise the expected score from an expert player. These are not necessarily the highest scores that can be attained, nor are they always the best contract that could be reached; for example, a biddable contract may be defeated by an unusual distribution or by an alert defense. Preferably, average scores or contracts may also be set forth corresponding to the level of skill of the players for the instructional information which is supplied.

Figure 3:
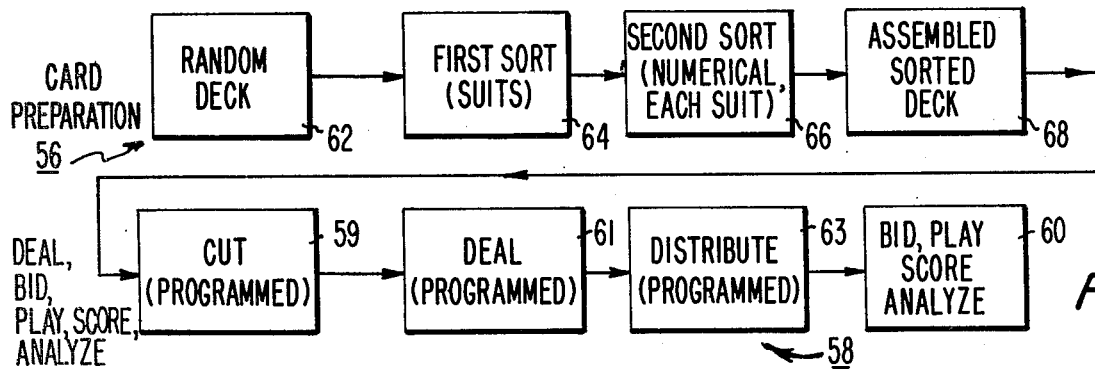
FIG. 3 is a schematic block diagram of a method of dealing predetermined bridge hands embodying this invention and for employing the device of FIGS. 1 and 2.
Figure 4A:
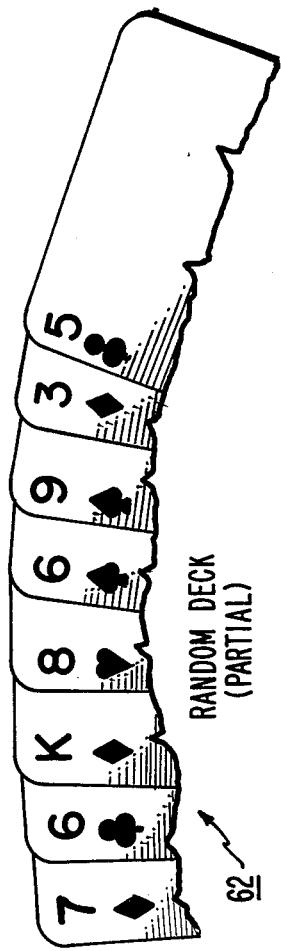
FIGS. 4a, 4b, 4c and 4d are plan views of different sorted conditions of a deck of bridge cards used in the method of FIG. 3.
Figure 4B:
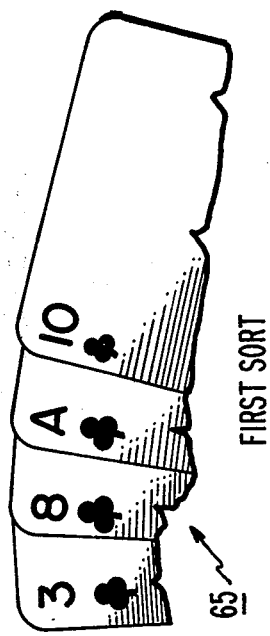
Figure 4C:
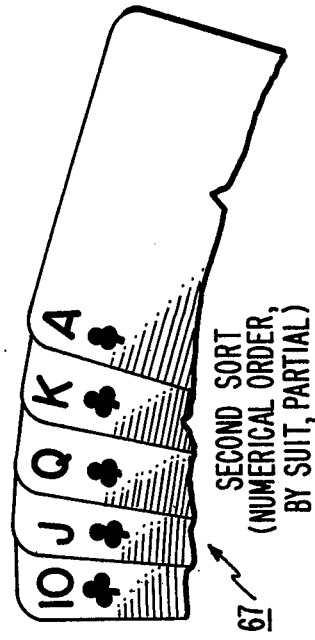
Figure 4D:
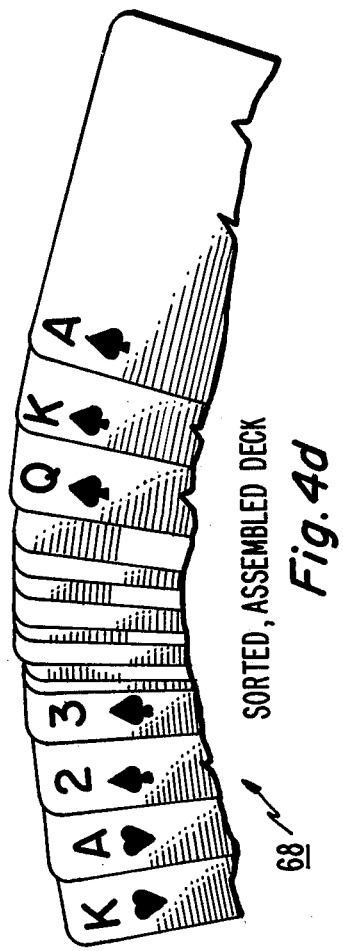

The operation of the device of this invention and the use thereof in the instruction of the game of bridge is illustrated by the block diagram of FIG. 3. The operation has three parts: That of card preparation 56, card dealing 58 into the four hands 58, and the following operations 60 of bidding, playing and instruction analysis. The card preparation 56 starts with a random deck 62 of bridge cards, which may be the cards used in a preceding game by the same players. Starting with this random deck 62, shown partially in FIG. 4a, a first sort operation 64 is applied to that deck by arranging all of the cards in the respective four suits of clubs 65 (FIG. 4b), diamonds, hearts and spades. Thereafter, a second sort 66 is applied to each of the first sorted suits, and the second sort is to place the cards in numerical order 67, for example, in conventional fashion of Ace, King, Queen, etc. (FIG. 4c). Thereafter, each of the numerically sorted suits are assembled into the fully sorted deck 68 (FIG. 4d); this assembly may be done by picking up the spade suit first, then placing the heart suit under the spades, then the clubs beneath the hearts, and lastly, the diamonds. The assembled sorted deck is turned face down (ace of spades on bottom) and is now ready for dealing the hand.

Figure 2:
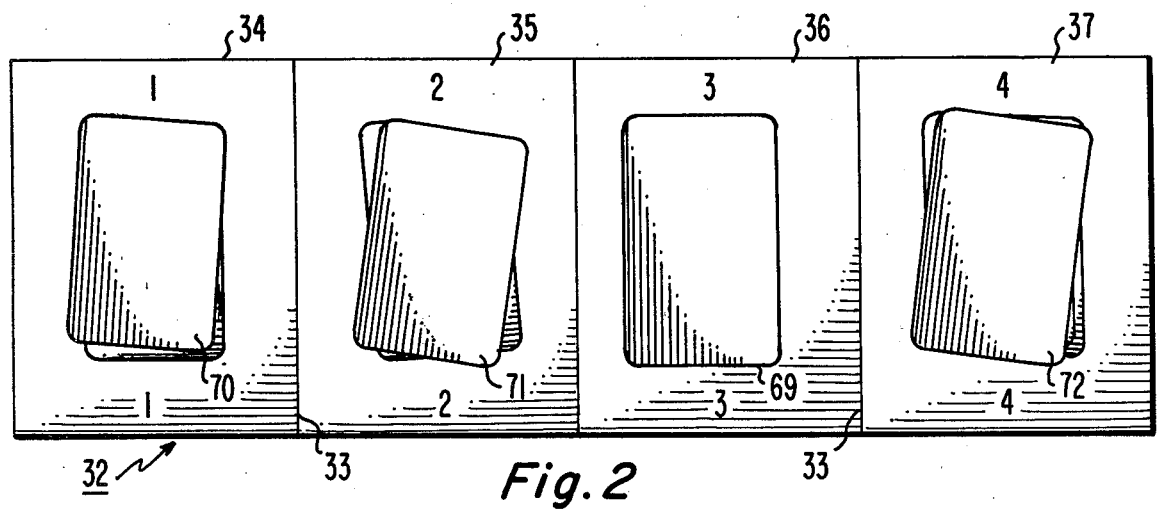
FIG. 2 is a plan view of another portion of the device embodying this invention illustrated in a condition of use.
Figure 5:
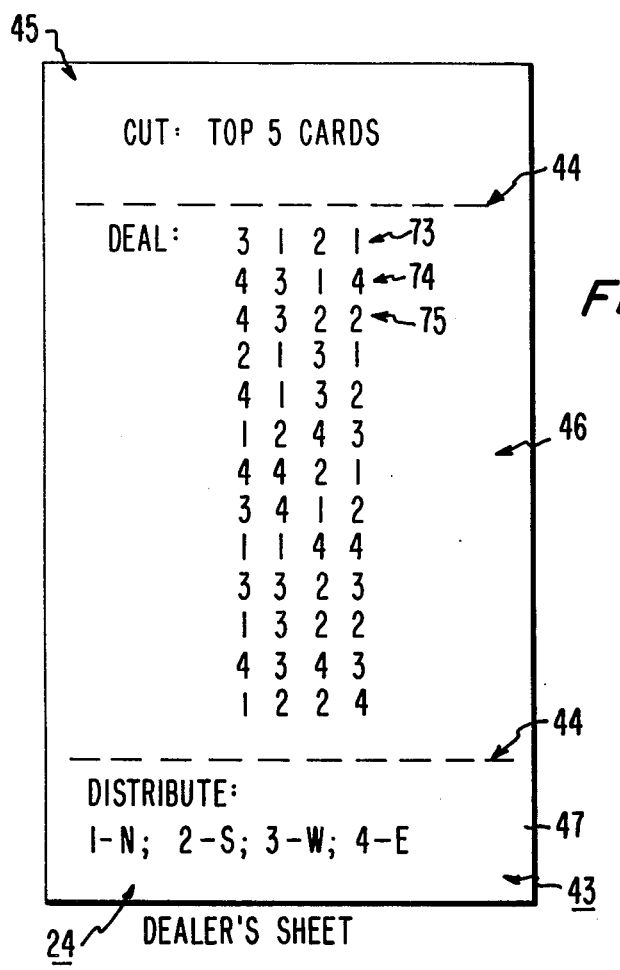
FIG. 5 is a face view of the underside of one of the dealer sheets from the dealer's pad of FIG. 1.

The dealer removes the top dealing sheet 24 from the pad 22 and without permitting the other players to see it, turns it over to see the underface 43 (FIG. 5). The particular dealer is illustrated in the label 40 on the top face (shown in FIG. 1). This dealer places the quadripartite dealing board 32 in front of him with the face up as illustrated in FIG. 2. Following the detailed program instructions printed on the underface 43 of the deal sheet 24 (FIG. 5) the dealer initially cuts the cards; in the example shown he takes the top five cards (without changing their own sequence) and places them underneath the deck 68. Thereafter, he deals the cards from the top of the cut deck in the customary way by placing each card 70, 71, 72 in turn in the designated quarter 34, 35, 36, 37 of the dealing board 32. He repeats this operation for each four cards going down line by line 73, 74, 75 in the programmed deal section 46.

After all of the cards have been dealt into the quadripartite divisions 34-37, the dealer distributes each hand in accordance with the program set forth in the distribute section 47 of dealing sheet 24. For the example illustrated in the dealing sheet of FIG. 5, the distribution specifies that the hand in the first division 34 is given to the North player, the hand in the second division 35 to the South player, the hand in the third division 36 to the West player, and the hand in the fourth division 37 to the East player.

With the dealer concealing the dealing instructions from the other players, and with the preliminary cut operation and distribution operation, the other players cannot ascertain the location of specific cards as they are dealt. Likewise the dealer himself will not know the location of key cards because he will be fully engrossed in following the dealing instructions and will be unable to concentrate on memorizing card locations at the same time. Thereafter, the playing of the game proceeds by bidding and playing out the hand. Following the completion of the play and the scoring, the corresponding analysis sheet identified by the label 42 is turned over and the players are in a position to see what the expected contract and scores 50 and 52 are and to follow through an instruction analysis 54 corresponding to that of the level of an expert or of an appropriate level for the players who are being instructed.

Figure 6:
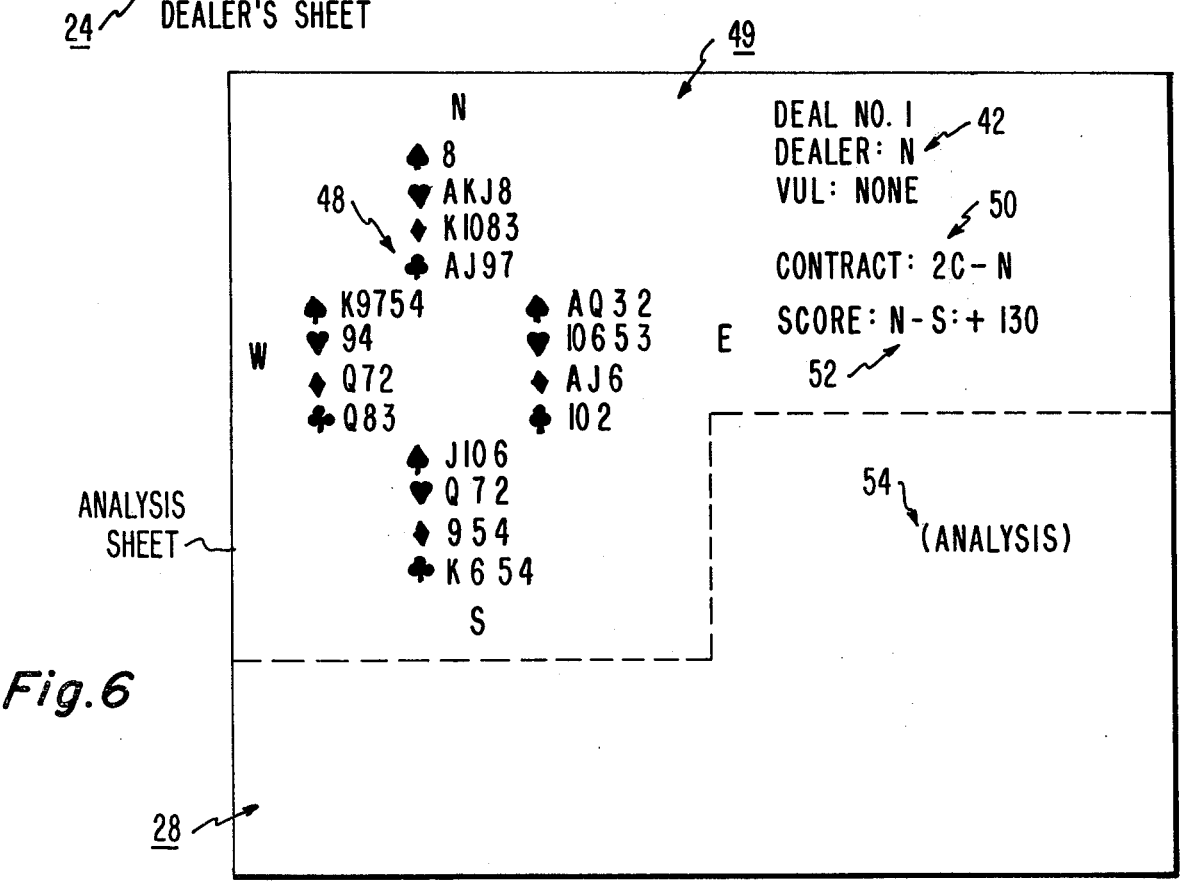
FIG. 6 is a face view of the underside of one of the sheets of the analysis pad of the device of FIG. 1.

The dealing information for each game is arbitrarily and randomly established. That is, the cut is arbitrarily chosen, and the quantity of cut is generally different from deal to deal on a random basis so that there is no predisposition of pattern. The cut cyclically displaces a predetermined number of cards preferably from the top to the bottom of the deck. This arrangement, coupled with the lower rank of cards being at the top of the pre-sorted deck tends to embed the higher rank cards within the deck making them more difficult to identify during dealing. Likewise, the distribution is arbitrarily and randomly selected and this distribution varies from deal to deal generally so that there is no predisposition to a pattern. From the chosen cut and distribution, the dealing program code of a particular hand is established so that the appropriate cards are supplied to the associated hands corresponding to the hand format 48 of FIG. 6. The cards as dealt are sorted by rank and suit in each hand so that the players do not have to perform this task required in standard dealing, which is time-consuming and undesirably tends to reveal suit distributions in the hands of inexperienced players. Thereby, without limitation, a wide variety of dealing operations may take place without any player knowing the cards of any other player in each particular deal.

The dealer pad 22 and the instruction pad 26 are fixed to the backer 30, each bound with gluing on two edges (preferably opposite edges) so that the sheets will not accidentally turn over to expose any part of their respective information which would spoil the play for the users. Accordingly, each player receives his pre-sorted hands, and bids and plays it as in conventional rubber or duplicate bridge without any preknowledge of any aspect of the results (that is to say without knowledge of scoring, the expected contract or recommended modes of play).

Figure 7:
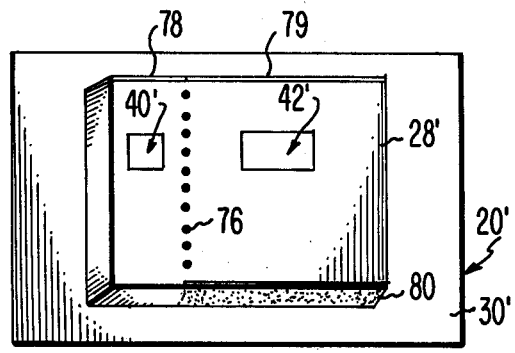
FIG. 7 is a plan view of a modified form of this invention.

The analysis sheets 28 are used to chart the results for the players after they have fully completed their play of the game. These result charts may be on separate sheets 28 (as shown in FIG. 1) and connected to the dealing sheets 24 by glued mounting on the common backer sheet 30 and by the association of the corresponding label information 40 and 42. These result sheets 28 may also be physically connected to but separable from the dealing sheets as shown in the preferred embodiment of FIG. 7, in which parts corresponding to these previously described are referenced by the same numerals with the addition of a prime ('). In this preferred embodiment, each of the dealer sheets 24' is connected to its associated analysis or result sheet 28' by a perforated-line connection 76. The top edges 78, 79 of both sheets 24', 28' are glued over their entire length, and the bottom edge 80 of the analysis sheet 28' alone is glued in the form of an integrated pad. But the bottom edge of the dealer sheet may be left partly unglued, so that the dealer can readily remove each sheet by starting at the ear at the lower left corner of the dealer sheet 24'. The sheet 24' can be separated from the analysis sheet 28' along the perforation 76 so that only that dealer sheet may be detached for the dealing operation, while the corresponding analysis sheet 28' is attached to the pad by the glued top and bottom edges 79 and 80 until after the play is completed and the players are ready for their recapitulation and for their analysis. When assembled on the pad, the cut section 45 is at the top glued edge 78 and not visible without at least partial removal of the sheet.

In another modified form of the invention, the results may be on a section of the dealer sheet, which section is not physically easily separated from the dealer sheet, but which may be folded over or otherwise covered so as to be not visible to the dealer during the dealing operation, but only made visible to the players after the play is completed and they are interested in determining the comparative results.

The designation of vulnerability in the label 42 may be determined by how the game was originally played in a tournament, by arbitrary designation for instructional purposes or merely by the conventional technique of equalizing the vulnerability on a cyclic basis as in tournament play. Within the pad of games that are supplied, the vulnerability is cyclically distributed so as to be equalized in its distribution. Score sheets are also supplied as part of the package, and these may be prepared in a conventional fashion, and may include the cyclical pattern of vulnerability.

In setting up a pad of games, the strength of cards to be supplied to the designated players can be distributed so that the expected points to be earned are equalized for each team over a group of games (e.g., eight deals).

This invention has substantial advantages in teaching skills in the game of bridge. For example, after going through the bidding and playing of a deal followed by the assistance of an accompanying analysis, either with a teacher or that of the analysis sheet 28 alone, the same deal can be replayed and dealt using the same dealer chart 24, again without the players knowing the cards in each other's hands. Thereby the additional experience of re-playing the hand is acquired which is recognized to be a very valuable instructional procedure for students of the game.

Other modifications of this invention will be apparent to those skilled in the art from the above description of illustrative embodiments. For example, the cut may be constructed in a plurality of parts, one part to be performed by the dealer, and another by a particular one of the players who follows a program section made visible only to him. Similarly, the distribution may be performed by a player different than the dealer. The demarcations 44 between sections of the dealer sheet may be by special spacing or grouping of information with or without other indicia of demarcation; board 32 may be quadrant divided.

Thus, the above described invention provides a new and improved device and method for dealing predetermined bridge hands from a standard deck of cards. An indefinitely large number of hands can be dealt and supplied the user in inexpensive form and without complicated apparatus. The standard mode of dealing is closely approximated. The invention is especially useful for instructing the average bridge player who has not had the benefit or stimulus of comparative scoring. The instruction can be supplied immediately following the playing of a deal which freshly follows the dealing of the cards in the above-shown manner.

It will be apparent to those skilled in the art from the foregoing illustrative description that this invention may be embodied in a variety of forms; thus the invention is not limited to the specific embodying details, but is of a scope set forth in the following claims.

What is claimed is:

1. A device for use in the game of bridge comprising:
   a plurality of first chart sheets each associated with a deal of bridge and supplying chart information for controlling the dealing of predetermined hands of cards to the four players of a bridge game without the players identifying the cards in the hands dealt to other players;
   a plurality of second chart sheets individually associated with said first chart sheets, each for supplying the players with results of the deal corresponding to the associated first chart;
   said first chart sheets including a first section for directing a cut of a pre-sorted deck of cards, a second section for directing the dealing of the cut deck into four identifiable hands of the deal, and a third section directing the distribution of the dealt hands to the four players in accordance with their positions around a bridge table.

2. A bridge game device as recited in claim 1 wherein:
   said second chart sheets each include a printed section of the associated hands as dealt and distributed to the players, a printed section indicating an expected contract and score after play, and a printed section instructing in the bidding and play.

3. A bridge game device as recited in claim 1 wherein:
   each of said second chart sheets are physically connected to the associated one of said first chart sheets.

4. A bridge game device as recited in claim 1 wherein:

each of said first chart sheets is separable into a portion that can be handled separate from the associated one of said second chart sheets.

5. A bridge game device as recited in claim 4 wherein:
   each of said first and second chart sheets are joined along a line of perforations, and said first and second chart sheets are assembled in a pad glued along one common edge of both said first and second chart sheets, said second chart sheets also being glued along the opposing edges thereof,
   whereby each of said first chart sheets, when the top sheet of said pad, may be detached and separated from said pad and the associated one of said second sheets which can remain secured to the pad until the playing of the deal is concluded.

6. A bridge game device as recited in claim 3 wherein:
   said first and second chart sheets are assembled in a pad arrangement on a common backing sheet,
   said first and second sheets have the associated deal identification information on the top faces thereof when assembled in said pad arrangement and have respectively said dealing and results information on the underfaces thereof so that said dealing and results information becomes available to the players upon removal from said pad.

7. In a bridge game, the method of dealing, in a plurality of deals, a deck of bridge cards in predetermined hands of cards to four players having certain positions around a table without the players identifying the cards in the hands dealt to the other players in each deal, said method comprising:
   sorting the cards according to rank and suit for each deal;
   using programmed charts to cut and deal the cards into hands and to distribute the hands;
   and, by following the directions of programmed charts, performing the steps of:
   (1) cutting the sorted deck of cards differently for the plurality of deals,
   (2) dealing the cards of the cut deck into four identifiable hands differently for the plurality of deals, and
   (3) distributing the dealt hands to the four players in accordance with their positions around a bridge table differently for the plurality of deals;
   whereby, one or more groups of four players can play designated hands of bridge and compare their respective results with each other or with expected results.

8. In a bridge game, the method of dealing as recited in claim 7 wherein:
   said step of cutting the deck by following said chart directions includes cyclically displacing a predetermined number of cards from the top of the sorted deck to the bottom thereof.

9. In a bridge game, the method of dealing as recited in claim 8 wherein:
   said sorting the cards according to rank and suit includes sorting by rank within each suit from the highest to lowest rank starting at the bottom of the deck looking at the faces of the cards,
   whereby after cutting the sorted deck, the higher rank cards of the bottom suit are covered by the cut cards.

* * * * *